Figures 1, 2:
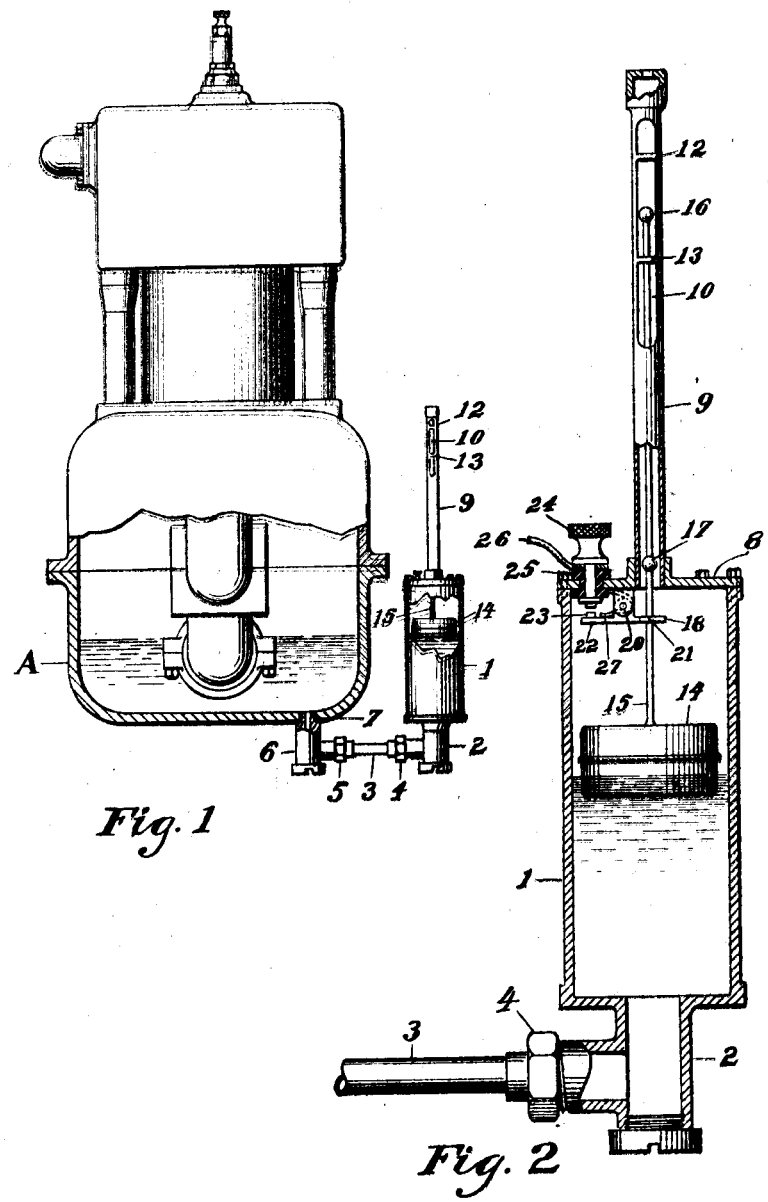

W. V. HERB & G. A. KING.
AUTOMATIC OIL GAGE.
APPLICATION FILED JULY 15, 1914.

1,163,919.

Patented Dec. 14, 1915.

Witnesses
C. F. Rudolph
P. M. Smith

Inventor
Wm. V. Herb,
Geo. A. King,
By Victor J. Evans
Attorney

UNITED STATES PATENT OFFICE.

WILLIAM V. HERB AND GEORGE A. KING, OF ALLENTOWN, PENNSYLVANIA.

AUTOMATIC OIL-GAGE.

1,163,919.    Specification of Letters Patent.    Patented Dec. 14, 1915.

Application filed July 15, 1914. Serial No. 851,231.

*To all whom it may concern:*

Be it known that we, WILLIAM V. HERB and GEORGE A. KING, citizens of the United States, residing at Allentown, in the county of Lehigh and State of Pennsylvania, have invented new and useful Improvements in Automatic Oil-Gages, of which the following is a specification.

This invention relates to automatic oil gages for engines, the object in view being to produce a combined oil gage and cut out for the electrical ignition systems of internal combustion engines, whereby the level of oil in the crank case may be ascertained at a glance, and also whereby, when the oil has been lowered in the crank case to the danger point, the ignition system of the engine will be automatically cut out and the engine thereby stopped, rendering it impossible for the operator to again start his engine until the supply of oil in the crank case has been replenished.

A further object of the invention is to provide such apparatus in the form of an attachment applicable to any internal combustion motor now in use.

With the above and other objects in view, the invention consists in the novel construction, combination and arrangement of parts, as herein described, illustrated and claimed.

In the accompanying drawings:—Figure 1 is a vertical section through the device of this invention shown applied to an engine which is also illustrated in cross section. Fig. 2 is an enlarged vertical section through the upper part of the oil chamber, showing the sight gage in elevation.

Referring to the drawings A designates the crank case of an engine which is conventionally shown and in connection with which the combined gage and cut out of this invention is employed.

In carrying out the present invention, we use an oil chamber 1 which is preferably cylindrical in shape for the sake of economy and which stands vertically at one side of and exteriorly of the engine as shown in Fig. 1. The cylindrical oil chamber 1 is provided with a reduced tubular neck 2 at the bottom thereof to which is connected a pipe 3 by means of a suitable coupling or union 4. This pipe is connected at its opposite end by a union 5 to a nozzle 6 which is shown as shouldered and threaded at 7 adapting it to be screwed into a threaded opening in the crank case as shown in Fig. 1, whereby the level of oil in the crank case will find the same level in the oil chamber 1.

The oil chamber 1 is provided at the top thereof with a cap 8 and extending upwardly therefrom is a tubular casing or sight tube 9 containing a glass tube, one side of the tube 9 which is of metal being cut away to form an observation opening or slot 10 having upper and lower cross bars 12 and 13 respectively, which indicate the top and bottom levels of the oil in the crank case for a purpose which will hereinafter appear.

Mounted to move upwardly and downwardly in the oil chamber 1 is an air tight float 14 and extending upwardly therefrom is a stem 15 which is provided at its upper extremity with an enlargement shown in the form of a ball 16 preferably colored red or some other distinguishing color readily seen through the glass tube 10. At a lower point, the stem is provided with another ball or shoulder 17 which is adapted to come into contact with the extremity of one arm 18 of a contact lever 19 which is fulcrumed at 20 on the lower side of the cap 8 of the oil chamber. The said arm 18 is slotted or forked as shown at 21 to allow the stem 15 to pass therefrom and to enable the lower ball or shoulder 17 to depress said arm 18 of the lever. The other arm 22 of the lever carries a platinum contact point 23 which is adapted to touch the lower extremity of a binding post 24 which passes through the cap 8 and is insulated therefrom by a washer 25. The binding post extends above and exteriorly of the cap 8 and is designed to have the ground wire 26 of the magneto or other electrical source of energy attached thereto, said magneto or source of energy furnishing the current which supplies the ignition system of the engine.

The device hereinabove described is adapted to be fastened to the crank case of any internal combustion engine and especially the internal combustion engines now in common use in automobiles. When the ball 16 registers with the lower cross bar 13, it indicates that the oil in the crank case is up to the lower try cock of the crank case and when it registers with the upper cross bar 12, it indicates that the oil is up to the level of the upper try cock of the crank case, the crank case then containing the proper amount of oil for perfect lubrication of the engine. If the owner or operator of an automobile neglects to put oil in the crank case or depends upon someone else to fill the crank case or in the event of one of the oil pipes breaking and the oil leaking out of the crank case, the lower ball or shoulder 17 will come in contact with the cut out lever and the weight of the float will move said lever until it comes in contact with the binding post thereby grounding the wire from the magneto and cutting out the ignition current, thereby stopping the engine before any damage is done to the bearings, cylinder walls and piston for lack of the proper supply of lubricating oil. It will also be understood that the engine cannot be again started until a fresh supply of oil is put into the crank case thereby causing the float to rise and move the contact lever or element out of touch with the binding post. A spring 27 is employed to insure breaking the contact between said lever and binding post.

The invention hereinabove described saves much trouble and annoyance as compared with the present method of ascertaining the level of oil in the crank case, it being unnecessary under the present invention to open the upper try cock which is usually within the pan under the engine and exceedingly dirty, being more or less filled with grease and oil. In addition to this it is usually so dark in the pan that it is impossible to observe whether or not oil is running from the upper try cock and if the hand is inserted to ascertain whether or not the oil is running, the hands and clothing of the operator are soiled. Therefore it is common practice to add a small amount of oil to the crank case each day and this guess work often results in the oil getting too low and causing the bearings to be burned out and the cylinder walls scored to such an extent as to greatly impair the working of the engine and possibly ruin the same altogether.

The apparatus hereinabove described is entirely automatic in operation, causing the engine to stop when the oil reaches the danger point and preventing the operator or driver from again starting the engine until the oil supply is replenished.

What we claim is:—

The combination with the crank case of an internal combustion engine, of an oil chamber arranged exteriorly and at one side of said crank case and in communication with the oil space in said crank case whereby the same oil level is maintained in both the crank case and said oil chamber, a cap for said oil chamber, a gage tube extending upwardly from said cap, a float in said oil chamber, a stem extending from said float upwardly within said gage tube through which it is visible, a shoulder on said stem, a source of electrical energy for the ignition system of said engine, and a circuit closer contained within said oil chamber and controlled by the shoulder on the stem in accordance with the movement of said float for grounding said source of energy and thereby stopping the engine at a predetermined level of oil in said chamber.

In testimony whereof we affix our signatures in presence of two witnesses.

WILLIAM V. HERB.
GEORGE A. KING

Witnesses:
HARRY GLICK,
HOWARD C. SCHLONCH.